United States Patent
Bang et al.

(10) Patent No.: US 7,967,461 B2
(45) Date of Patent: Jun. 28, 2011

(54) BACKLIGHT MODULE

(75) Inventors: Juyoung Bang, Seoul (KR); Byunghwa Ji, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 197 days.

(21) Appl. No.: 12/285,781

(22) Filed: Oct. 14, 2008

(65) Prior Publication Data

US 2010/0232136 A1    Sep. 16, 2010

(30) Foreign Application Priority Data

Oct. 19, 2007  (KR) .................... 10-2007-0105335
Dec. 28, 2007  (KR) .................... 10-2007-0141006

(51) Int. Cl.
    *G09F 13/04*    (2006.01)
(52) U.S. Cl. .................. 362/97.1; 362/330; 362/225
(58) Field of Classification Search ........ 362/97.1–97.4, 362/330, 223, 224, 225, 326, 327, 328
    See application file for complete search history.

(56) References Cited

U.S. PATENT DOCUMENTS

| | | | |
|---|---|---|---|
| 7,553,058 B2 * | 6/2009 | Chang ............... | 362/607 |
| 7,726,826 B2 * | 6/2010 | Kusano et al. ........ | 362/97.1 |
| 2007/0171671 A1 * | 7/2007 | Kurokawa et al. ..... | 362/606 |
| 2008/0094845 A1 | 4/2008 | Kusano et al. | |

FOREIGN PATENT DOCUMENTS

| | | |
|---|---|---|
| CN | 101006307 | 7/2007 |
| WO | WO 2006/022270 A1 | 3/2006 |
| WO | 2006/137459 A1 | 12/2006 |

OTHER PUBLICATIONS

Office Action issued Dec. 18, 2009 in corresponding Chinese Application No. 200810170534.3.

* cited by examiner

*Primary Examiner* — Bao Q Truong
(74) *Attorney, Agent, or Firm* — Morgan, Lewis & Bockius LLP

(57) ABSTRACT

A backlight module is disclosed. The backlight module includes a light source producing light, a reflective plate that is positioned under the light source to reflect the light, and a prism plate including an incident surface and an emitting surface. The prism plate is positioned on the light source so that direct light from the light source and reflective light from the reflective plate are directly incident on the prism plate through the incident surface. A light scattering unit scattering the direct light and the reflective light is positioned on the incident surface of the prism plate, and a prism pattern changing a traveling path of light incident through the incident surface is positioned on the emitting surface of the prism plate.

14 Claims, 7 Drawing Sheets

BACKLIGHT MODULE

This application claims priority from Korean Patent Application No. 10-2007-0105335 filed on Oct. 19, 2007, and 10-2007-0141006 filed on Dec. 28, 2007, the contents of which are incorporated herein by reference in its entirety.

BACKGROUND OF THE INVENTION

1. Field of the Invention

Exemplary embodiments of the invention relate to a backlight module, and more particularly, to a direct-under type backlight module used in a liquid crystal display.

2. Description of the Related Art

Liquid crystal display has been used in notebook personal computers, office automatic equipments, audio/video equipments, etc. because of advantages such as miniaturization, thin profile, and low power consumption.

The liquid crystal display includes a liquid crystal display module and a backlight module. The backlight module may be classified into an edge type backlight module and a direct-under type backlight module depending on a location of a light source.

In the edge type backlight module, a light source is positioned around an edge of a light guide plate. While light produced by the light source is repeatedly reflected inside the light guide plate, the light is emitted to the liquid crystal display module through a main surface of the light guide plate.

In the direct-under type backlight module, a plurality of light sources is parallelly positioned under the liquid crystal display module, a reflective plate is positioned under the light sources, and a diffuser plate is positioned on the light sources. Light produced by the light sources is emitted to the liquid crystal display module through the diffuser plate.

Because the number of light sources in the direct-under type backlight module increases as compared with the number of light sources in the edge type backlight module, the direct-under type backlight module can achieve a high luminance of an image.

However, in the direct-under type backlight module, because the light sources are parallelly positioned at a constant distance therebetween, the luminance of the image just above the light sources is high, but the luminance of the image on a space between the light sources is low. Accordingly, the non-uniformity of luminance periodically occurs in the direct-under type backlight module, and thus the non-uniformity of display occurs on a display screen of the liquid crystal display module.

In the related art direct-under type backlight module, an air gap is thickly formed so as to solve the problems of the non-uniformity. However, the thick air gap causes a reduction in a degree of freedom in a combination of optical sheets of the direct-under type backlight module.

In other words, in case the air gap is thickly formed, the diffuser plate has to be positioned in a lowest portion of the optical sheet closest to the light source because a diffuser sheet and a prism sheet do not have a self bearing power.

Another method for solving the non-uniformity of luminance is to reduce the distance between the light sources. However, because the method causes an increase of the number of light, the manufacturing cost and the power consumption increased and a process for manufacturing the backlight module is complicated.

SUMMARY OF THE INVENTION

Exemplary embodiments of the invention provide a backlight module capable of obtaining a uniform luminance and achieving a thin profile.

Additional features and advantages of the exemplary embodiments of the invention will be set forth in the description which follows, and in part will be apparent from the description, or may be learned by practice of the exemplary embodiments of the invention. The objectives and other advantages of the exemplary embodiments of the invention will be realized and attained by the structure particularly pointed out in the written description and claims hereof as well as the appended drawings.

In one aspect, a backlight module comprises a light source producing light, a reflective plate that is positioned under the light source to reflect the light, and a prism plate including an incident surface and an emitting surface, the prism plate being positioned on the light source so that direct light from the light source and reflective light from the reflective plate are directly incident on the prism plate through the incident surface, wherein a light scattering unit scattering the direct light and the reflective light is positioned on the incident surface of the prism plate, and a prism pattern changing a traveling path of light incident through the incident surface is positioned on the emitting surface of the prism plate.

The light source includes line-shaped light sources, and the prism pattern extends in a longitudinal direction of the line-shaped light source to have a saw-toothed section or a trapezoid-shaped section.

The line-shaped light sources are positioned to be spaced apart from each other at a distance of 20 mm to 40 mm, and the prism plate is positioned so that a distance between the reflective plate and the incident surface of the prism plate is 5 mm to 15 mm.

A length of a base portion of the prism pattern in a width direction of the prism pattern is 10 µm to 500 µm, a height between the base portion and an apex of the prism pattern is 0.2 to 0.8 times the length of the base portion, an angle between the base portion and a side portion of the prism pattern is 35° to 45°, and a curvature of the apex is 20 µm to 200 µm.

The light source includes point light sources. The prism pattern has a saw-toothed section, a trapezoid-shaped section or a pyramid shape.

The prism plate further includes a base under the prism pattern. The base is formed of any one selected from polycarbonate, polymethylmethacrylate, MS (styrene-methacrylate) resin, polystyrene, polyethylene, or a combination thereof.

The base and the prism pattern are formed of the same material. The base and the prism pattern are formed using an injection molding method or an extrusion molding method. On the other hand, the base is formed using the injection molding method or the extrusion molding method, and then the prism pattern is formed using a hot press method.

The base includes organic beads such as polycarbonate, polymethylmethacrylate, MS resin and polystyrene or inorganic beads such as silica and silicon dioxide.

The base and the prism pattern are formed of different materials. The prism pattern is formed by stacking UV curing material, acrylic-based monomer or a binder on the base and then performing an UV curing process on a stacking structure.

The base includes organic beads such as polycarbonate, polymethylmethacrylate, MS resin and polystyrene or inorganic beads such as silica and silicon dioxide.

The base has a multi-layered structure formed of 2 or more different materials selected from polycarbonate, polymethylmethacrylate, MS resin, polystyrene, polyethylene, or a combination thereof, the multi-layered structure having 2 or more layers formed of different materials. The base is formed by extruding the 2 or more different materials using a coextrusion method.

At least one layer forming the base includes organic beads such as polycarbonate, polymethylmethacrylate, MS resin and polystyrene or inorganic beads such as silica and silicon dioxide.

Various combinations of optical films such as a diffuser sheet, a prism sheet, and a prism sheet with a high luminance may be positioned on the prism plate.

In the direct-under type backlight module having the above-described configuration, because the prism plate is positioned at a position closest to the light source, the non-uniformity of luminance can be efficiently suppressed while the thickness of the direct-under type backlight module is greatly reduced.

Further, because the light scattering unit is formed on the incident surface of the prism plate, the use efficiency of the light produced by the light source can increase.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF EMBODIMENTS

Figure 1:
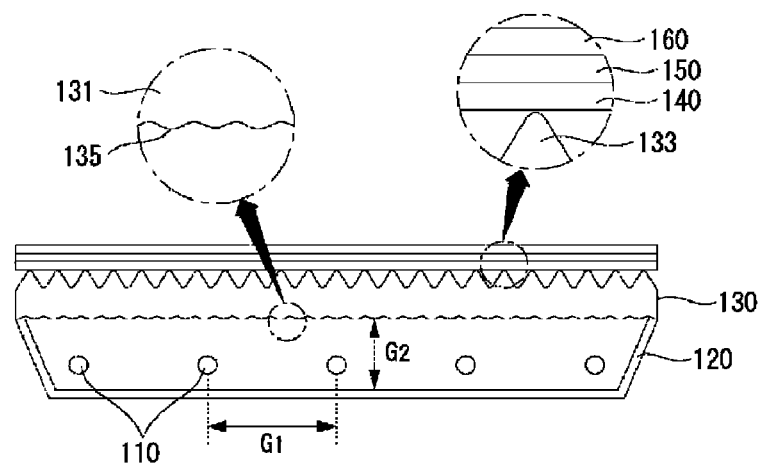
FIG. 1 is a cross-sectional view schematically showing a configuration of a backlight module according to a first exemplary embodiment of the invention.

Reference will now be made in detail embodiments of the invention examples of which are illustrated in the accompanying drawings.

In the drawings, the thickness of layers and regions are exaggerated for clarity. The same reference numerals are used to denote like elements throughout the specification. It will also be understood that when a layer is referred to as being "on" another layer or substrate, it can be directly on the other layer or substrate or intervening layers may also be present.

First Exemplary Embodiment

A backlight module according to a first exemplary embodiment of the invention will be described in detail with reference to FIGS. 1 to 6.

Figure 2:
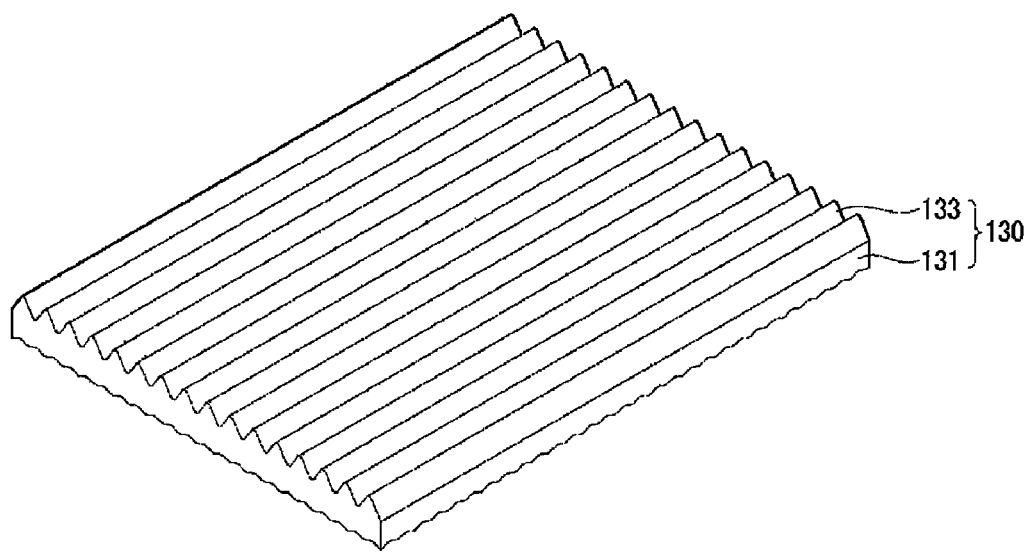
FIG. 2 is a perspective view of a prism plate used in the backlight module of FIG. 1.

FIG. 1 is a cross-sectional view schematically showing a configuration of a direct-under type backlight module according to a first exemplary embodiment of the invention, and FIG. 2 is a perspective view of a prism plate used in the direct-under type backlight module of FIG. 1.

Figure 3:
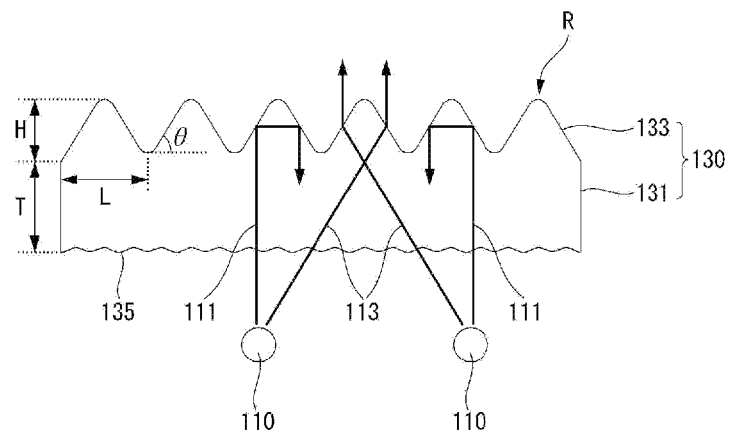
FIG. 3 schematically illustrates an operation of the prism plate shown in FIG. 2.

FIG. 3 schematically illustrates an operation of the prism plate shown in FIG. 2.

FIGS. 4 to 7 are experimental data showing a result measuring a luminance depending on changes in a length of a base portion of a prism pattern of the prism plate shown in FIG. 2 in a width direction of the prism pattern, changes in a height between the base portion and an apex of the prism pattern, changes in an angle between the base portion and a side portion of the prism pattern, and changes in a curvature of the apex.

In the first exemplary embodiment, a direct-under type backlight module including a line-shaped light source 110 such as a cold cathode fluorescent lamp (CCFL) or an external electrode fluorescent lamp (EEFL) will be described as an example. Instead of the line-shaped light source, a point light source such as a light emitting diode (LED) may be used.

As shown in FIG. 1, the direct-under type backlight module according to the first exemplary embodiment of the invention includes the plurality of line-shaped light sources 110 that are parallelly positioned. The line-shaped light sources 110 are spaced apart from each other at a distance G1 of 20 mm to 40 mm. A reflective plate 120 for reflecting light is positioned under the line-shaped light source 110.

A prism plate 130 is positioned on the line-shaped light source 110 by the reflective plate 120. It is preferable that the prism plate 130 is positioned so that a distance G2 between the reflective plate 120 and an incident surface of the prism plate 130 is 5 mm to 15 mm or 6 mm to 10 mm.

As shown in FIGS. 2 and 3, the prism plate 130 includes an incident surface, on which light produced by the line-shaped light sources 110 is incident, and an emitting surface, from which the incident light is emitted.

A base 131 forming the prism plate 130 may be formed of any one selected from polycarbonate, polymethylmethacrylate, MS resin, polystyrene, polyethylene, or a combination thereof. The base 131 may have a thickness T of about 1 mm to 3 mm.

Prism patterns 133 having a saw-toothed section extend along a longitudinal direction of the line-shaped light sources 110 on the emitting surface of the prism plate 130.

The prism pattern 133 having the saw-toothed section is a triangle projection pattern of a section cut in a direction perpendicular to a longitudinal direction of a corresponding row. A horizontal portion may exist between the triangle projection patterns. However, it is preferable that the triangle projection patterns are continuously formed so as to efficiently suppress the non-uniformity of luminance.

The base 131 and the prism pattern 133 may be formed of the same material or different materials.

In case the base 131 and the prism pattern 133 are formed of the same material, the base 131 and the prism pattern 133 are simultaneously formed using an injection molding method or an extrusion molding method. Otherwise, the base 131 is formed using an injection molding method or an extrusion molding method, and then the prism pattern 133 is formed using a hot press method.

In case the base 131 and the prism pattern 133 are formed of the different materials, the prism pattern 133 may be formed by stacking UV curing material, acrylic-based monomer, oligomer, polymer, or a binder on the base 131 and then performing an UV curing process on a stacking structure.

The prism pattern 133 on the emitting surface of the prism plate 130 totally reflects light 111 that is incident on the prism plate 130 in a direction perpendicular to the line-shaped light source 110. The prism pattern 133 on the emitting surface of the prism plate 130 emits light 113 that is incident on the prism plate 130 in a direction inclined to the perpendicular direction. Accordingly, the light coming from the line-shaped light sources 110 is uniformly emitted by passing through the prism pattern 133.

A light scattering unit 135 is positioned on the incident surface of the prism plate 130 to scatter direct light coming from the line-shaped light sources 110 and reflective light reflected by the reflective plate 120. The light scattering unit 135 having an uneven surface may be formed by performing an embossing process on a lower surface of the base 131 or performing a corrosion process on the lower surface of the base 131.

As above, when the light scattering unit 135 is formed on the incident surface of the prism plate 130, the light of the line-shaped light sources 110 can be more efficiently employed as compared with a case where the light scattering unit 135 is not formed.

FIGS. 4 to 7 are experimental data showing a result measuring a luminance depending on changes in a length L of a base portion of the prism pattern 133 in a width direction of the prism pattern 133, changes in a height H between the base portion and an apex of the prism pattern 133, changes in an angle θ between the base portion and a side portion of the prism pattern 133, and changes in a curvature R of the apex.

Figure 4:
FIG. 4 is an experimental data showing a result measuring a luminance depending on changes in a length of a base portion of a prism pattern of the prism plate shown in FIG. 2 in a width direction of the prism pattern.
Figure 4:
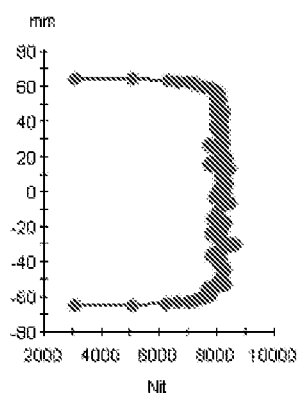
Figure 4:
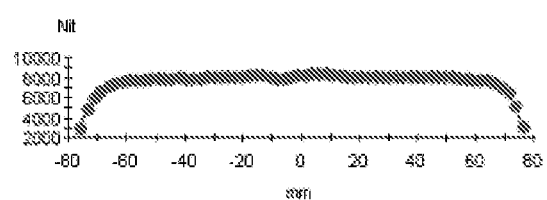

FIG. 4 shows the experimental data when the length L of the base portion of the prism pattern 133 in the width direction of the prism pattern 133 is 300 μm, the height H between the base portion and the apex of the prism pattern 133 is 90 μm, and the angle θ between the base portion and the side portion of the prism pattern 133 is 40°.

Figure 5:
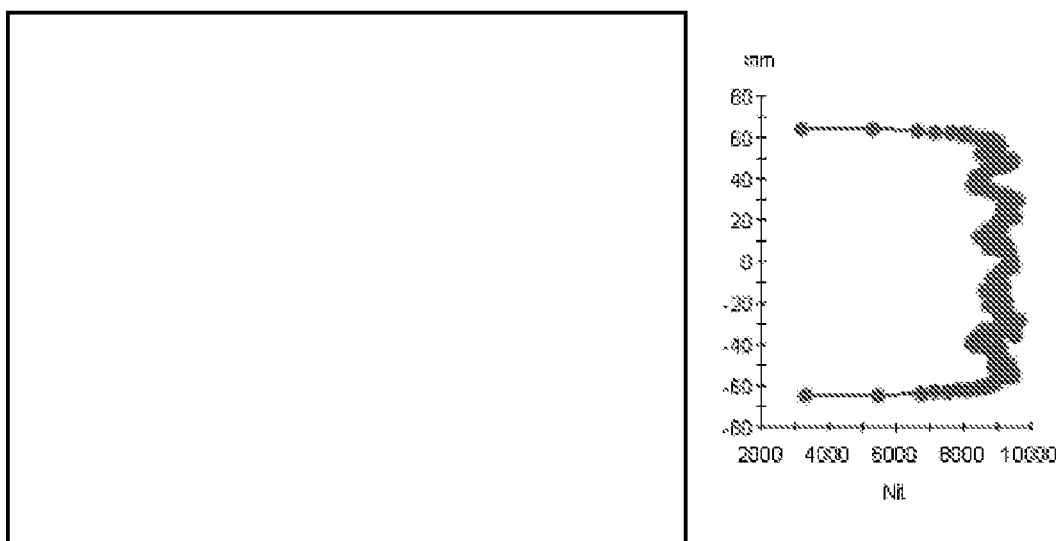
FIG. 5 is an experimental data showing a result measuring a luminance depending on changes in a height between a base portion and an apex of a prism pattern of the prism plate shown in FIG. 2.

FIG. 5 shows the experimental data when the length L of the base portion of the prism pattern 133 in the width direction of the prism pattern 133 is 300 μm, the height H between the base portion and the apex of the prism pattern 133 is 50 μm, and the angle θ between the base portion and the side portion of the prism pattern 133 is 40°.

Figure 6:
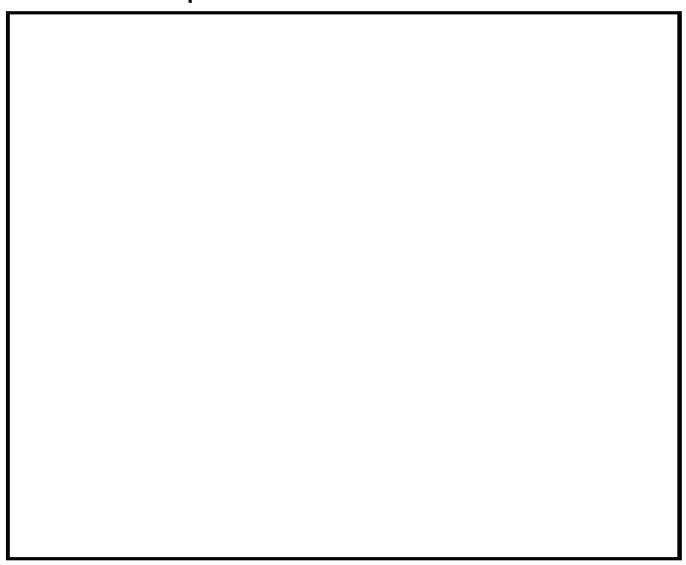
FIG. 6 is an experimental data showing a result measuring a luminance depending on changes in an angle between a base portion and a side portion of a prism pattern of the prism plate shown in FIG. 2, and changes in a curvature R of the apex.
Figure 6:
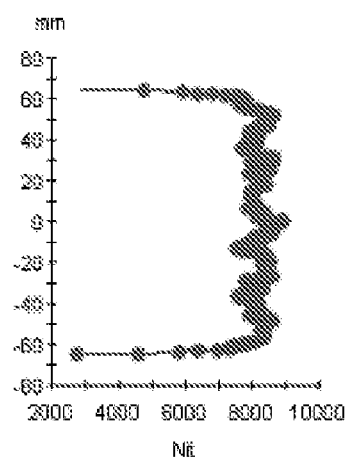
Figure 6:
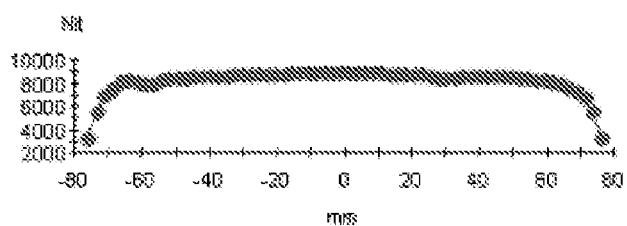

FIG. 6 shows the experimental data when the length L of the base portion of the prism pattern 133 in the width direction of the prism pattern 133 is 300 μm, the height H between the base portion and the apex of the prism pattern 133 is 90 μm, and the angle θ between the base portion and the side portion of the prism pattern 133 is 30°.

Figure 7:
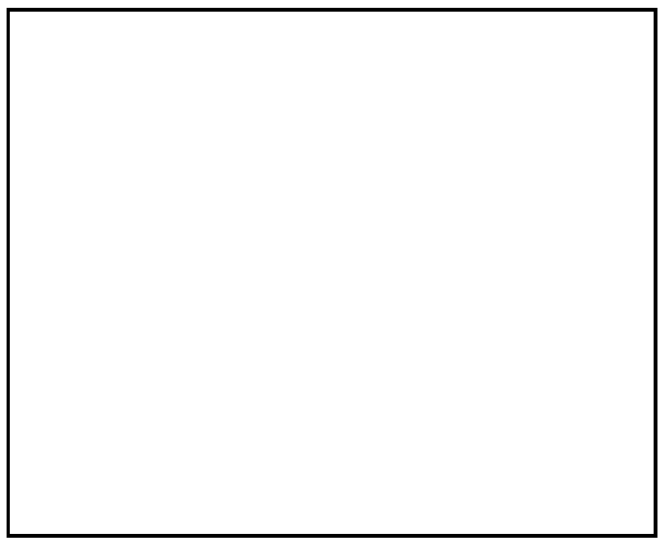
FIG. 7 is an experimental data showing a result measuring a luminance depending on changes in a curvature of an apex of a prism pattern of the prism plate shown in FIG. 2.
Figure 7:
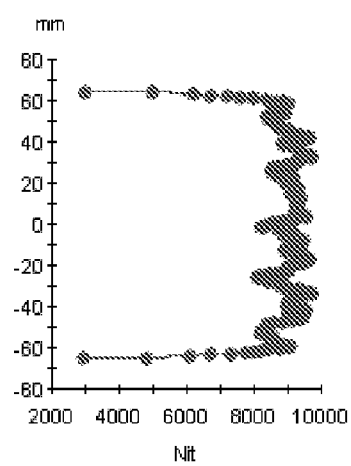
Figure 7:
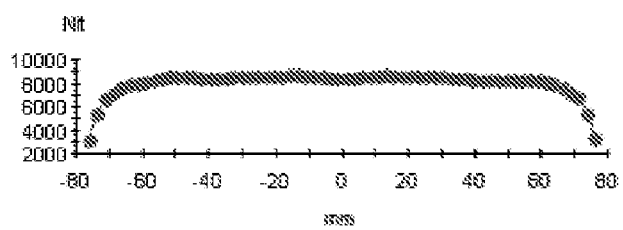

FIG. 7 shows the experimental data when the length L of the base portion of the prism pattern 133 in the width direction of the prism pattern 133 is 300 μm, the height H between the base portion and the apex of the prism pattern 133 is 50 μm, and the angle θ between the base portion and the side portion of the prism pattern 133 is 30°.

It is preferable that the length L of the base portion of the prism pattern 133 in the width direction of the prism pattern 133 is 10 μm to 500 μm, the height H between the base portion and the apex of the prism pattern 133 is 0.2 to 0.8 times the length L, the angle θ between the base portion and the side portion of the prism pattern 133 is 35° to 45°, and the curvature R of the apex is 20 μm to 200 μm. This reason will be understood from FIGS. 4 to 7. The apex is naturally formed in the form of curvature due to a manufacturing process of the prism pattern 133, and the curvature R of the apex satisfies the above curvature range.

It can be seen from FIGS. 5 to 7 that Mura occurs on the prism pattern 133 of FIG. 5 in which the height H between the base portion and the apex of the prism pattern 133 does not satisfy the above range, on the prism pattern 133 of FIG. 6 in which the angle θ between the base portion and the side portion of the prism pattern 133 does not satisfy the above range, and on the prism pattern 133 of FIG. 7 in which the height H between the base portion and the apex of the prism pattern 133 and the angle θ between the base portion and the side portion of the prism pattern 133 do not satisfy the above ranges.

However, Mura on the prism pattern 133 of FIG. 4 in which the length L of the base portion of the prism pattern 133, the height H between the base portion and the apex of the prism pattern 133, and the angle θ between the base portion and the side portion of the prism pattern 133 satisfy the above ranges is minimized as compared with Mura on the prism pattern 133 of FIGS. 5 to 7.

Various combinations of a diffuser sheet, a prism sheet, and a prism sheet with a high luminance may be positioned on the prism plate 130. For example, as shown in FIG. 1, a first diffuser sheet 140, a second diffuser sheet 150, and a prism sheet 160 with a high luminance may be sequentially positioned on the prism plate 130.

Second Exemplary Embodiment

A second exemplary embodiment of the invention will be described below with reference to FIG. 8. Structures and components identical or equivalent to those described in the first and second exemplary embodiments are designated with the same reference numerals, and the description thereabout is briefly made or is entirely omitted.

Figure 8:
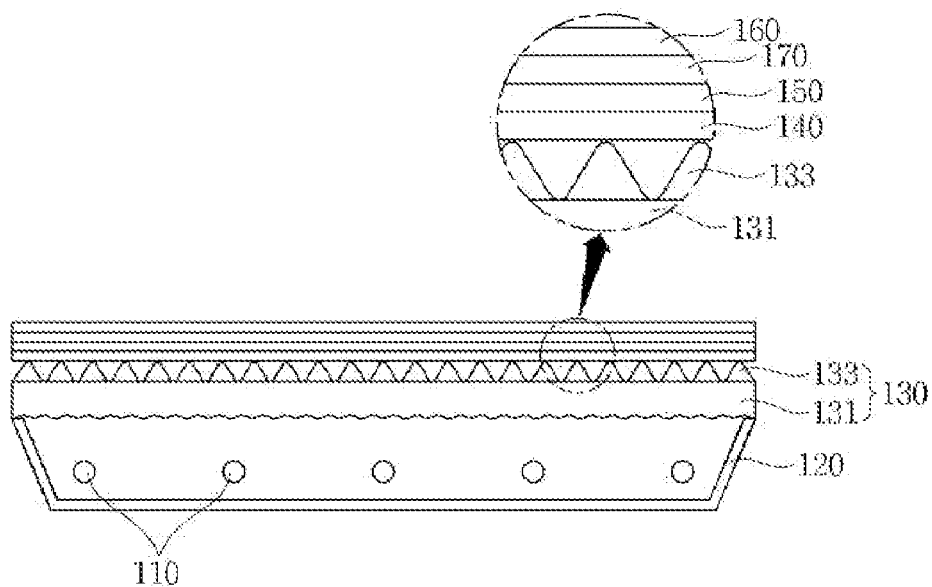
FIG. 8 is a cross-sectional view schematically showing a configuration of a backlight module according to a second exemplary embodiment of the invention.

As shown in FIG. 8, a base 131 and a prism pattern 133 of a prism plate 130 are formed of different materials. The prism pattern 133 may be formed by stacking UV curing material, acrylic-based monomer, oligomer, polymer, or a binder on the base 131 and then performing an UV curing process on a stacking structure.

A first diffuser sheet 140, a second diffuser sheet 150, a prism sheet 170, and a prism sheet 160 with a high luminance are sequentially positioned on the prism plate 130.

Although it is not shown, a third diffuser sheet may be used instead of the prism sheet 160 with the high luminance. The diffuser sheet, the prism sheet, and the prism sheet with the high luminance may be sequentially positioned on the prism plate 130; the prism sheet, the diffuser sheet, and the prism sheet with the high luminance may be sequentially positioned on the prism plate 130; or the prism sheet, the first and second diffuser sheets, and the prism sheet with the high luminance may be sequentially positioned on the prism plate 130.

As above, various combinations of the diffuser sheet, the prism sheet, and the prism sheet with the high luminance may be positioned on the prism plate 130.

Third Exemplary Embodiment

Figure 9:
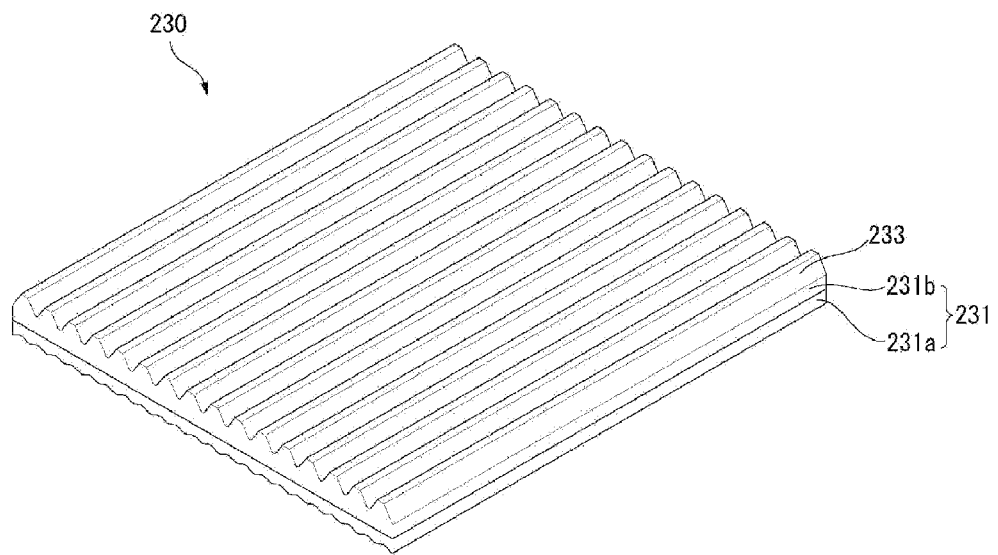
FIG. 9 is a perspective view of a prism plate used in a backlight module according to a third exemplary embodiment of the invention.

A third exemplary embodiment of the invention will be described below with reference to FIG. 9. FIG. 9 is a perspective view of a prism plate 230 according to the third exemplary embodiment of the invention. The prism plate 230 includes a base 231 having a double-layered structure in which two layers are formed of different materials. The base 231 includes a first base 231a and a second base 231b on the first base 231a. A prism pattern 233 having a trapezoid-shaped section is formed on the second base 231b.

Although FIG. 9 shows the case where the second base 231b and the prism pattern 233 are formed of the same material, the second base 231b and the prism pattern 233 may be formed of different materials in the same way as the second exemplary embodiment.

Fourth Exemplary Embodiment

A fourth exemplary embodiment of the invention will be described below with reference to FIGS. 10 and 11. In the fourth exemplary embodiment, a point light source 310 such as a light emitting diode is used as a light source, and a prism plate 330 is positioned on the point light source 310. A plurality of optical sheets is positioned on the prism plate 330. A line-shaped light source may be used instead of the point light source.

Figure 11:
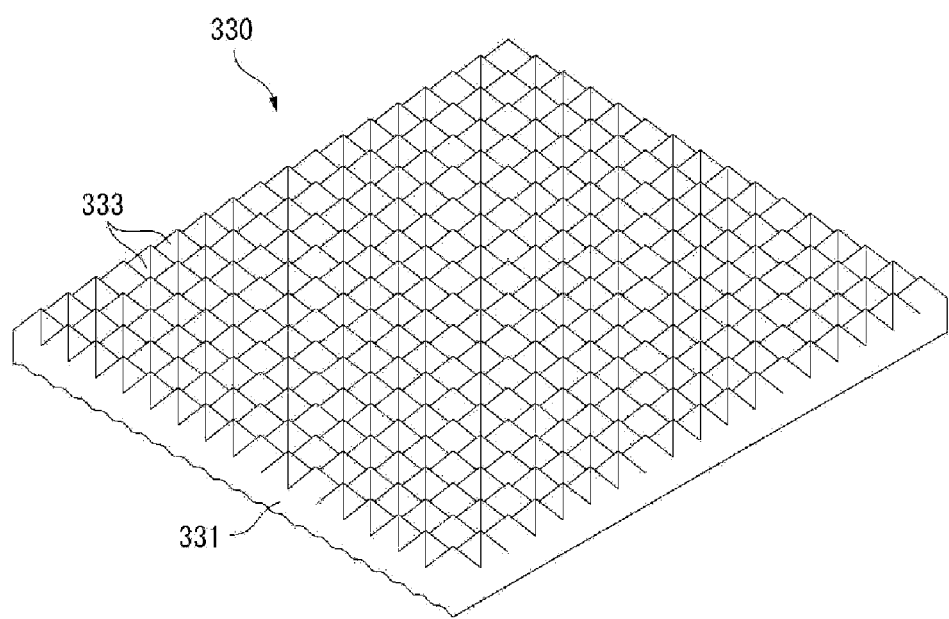
FIG. 11 is a perspective view of a prism plate used in the backlight module of FIG. 10.

As shown in FIG. 11, the prism plate 330 includes a base 331 and a plurality of pyramid-shaped prism patterns on the base 331.

The base 331 may include a diffuser material capable of diffusing light. The diffuser material may include inorganic filler and organic filler. The inorganic filler may include silica, aluminum hydroxide, aluminum oxide, titanium oxide, zinc oxide, barium sulfate, magnesium silicate, silicon dioxide, or a combination thereof. The organic filler may include acrylic-based resin, acrylonitrile, polycarbonate, polymethylmethacrylate, MS resin, polyurethane, polyvinyl chloride, polystyrene-based resin, polyacrylonitrile, polyamide, polysiloxane-based resin, melamine-based resin, and benzoguamine-based resin.

The shape of the diffuser material used in the prism plate 330 is not particularly limited, but may be a circle, a stick and plate, etc. It is preferable that the diffuser material is bead 337 capable of isotropically diffusing light.

In case the prism plate 330 includes the beads 337 inside the base 331, the uniformity of light emitted from an emitting surface of the prism plate 330 can be further improved.

Figure 10:
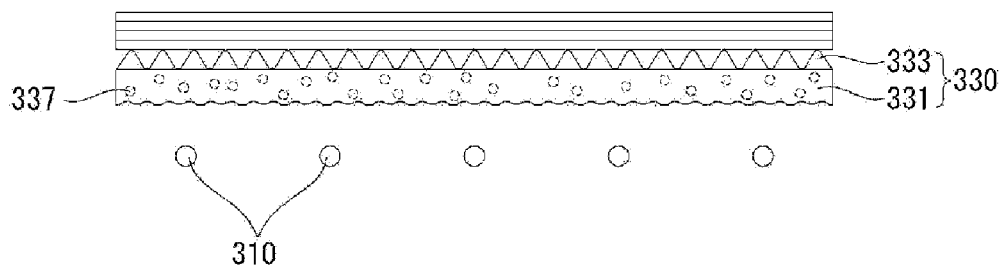
FIG. 10 is a cross-sectional view schematically showing a configuration of a backlight module according to a fourth exemplary embodiment of the invention.

Although FIGS. 10 and 11 show the case where the base 331 and the prism pattern 333 are formed of the same material, the base 331 and the prism pattern 333 may be formed of different materials in the same way as the second exemplary embodiment.

The base 331 may have a double-layered structure in the same way as the third exemplary embodiment. Although it is not specifically shown, the prism plate described in the first to third exemplary embodiments may include the beads 337.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A backlight module comprising:
a light source producing light;
a reflective plate that is positioned under the light source to reflect the light; and
a prism plate including an incident surface and an emitting surface, the prism plate being positioned on the light source so that direct light from the light source and reflective light from the reflective plate are directly incident on the prism plate through the incident surface,
wherein a light scattering unit scattering the direct light and the reflective light is positioned on the incident surface of the prism plate, and a prism pattern changing a traveling path of light incident through the incident surface is positioned on the emitting surface of the prism plate,
wherein the light source is composed of line-shaped light sources, and the prism pattern extends in a longitudinal direction of the line-shaped light source and have a saw-toothed section or a trapezoid-shaped section, and
wherein the line-shaped light sources are positioned to be spaced apart from each other at a distance of 20 mm to 40 mm, and the prism plate is positioned so that a distance between the reflective plate and the incident surface of the prism plate is 5 mm to 15 mm, and
wherein a length of a base portion of the prism pattern in a width direction of the prism pattern is 10 µm to 500 µm, a height between the base portion and an apex of the prism pattern is 0.2 to 0.8 times the length of the base portion, an angle between the base portion and a side portion of the prism pattern is 35° to 45°, and a curvature of the apex is 20 µm to 200 µm.

2. The backlight module of claim 1, wherein the light source is composed of point light sources, and the prism pattern has a pyramid shape.

3. The backlight module of claim 1, wherein the prism plate further includes a base under the prism pattern.

4. The backlight module of claim 3, wherein the base has a single-layered structure formed of any one selected from polycarbonate, polymethylmethacrylate, MS resin, polystyrene, polyethylene, or a combination thereof.

5. The backlight module of claim 4, wherein the base and the prism pattern are formed of the same material.

6. The backlight module of claim 5, wherein the base and the prism pattern are formed using an injection molding method or an extrusion molding method.

7. The backlight module of claim 5, wherein the base is formed using the injection molding method or the extrusion molding method, and then the prism pattern is formed using a hot press method.

8. The backlight module of claim 5, wherein the base includes organic beads such as polycarbonate, polymethylmethacrylate, MS resin and polystyrene or inorganic beads such as silica and silicon dioxide.

9. The backlight module of claim 4, wherein the base and the prism pattern are formed of different materials.

10. The backlight module of claim 9, wherein the prism pattern is formed by stacking UV curing material, acrylic-based monomer or a binder on the base and then performing an UV curing process on a stacking structure.

11. The backlight module of claim 9, wherein the base includes organic beads such as polycarbonate, polymethylmethacrylate, MS resin and polystyrene or inorganic beads such as silica and silicon dioxide.

12. The backlight module of claim 3, wherein the base has a multi-layered structure formed of 2 or more different materials selected from polycarbonate, polymethylmethacrylate, MS resin, polystyrene, polyethylene, or a combination thereof, the multi-layered structure having 2 or more layers formed of different materials.

13. The backlight module of claim 12, wherein the base is formed by extruding the 2 or more different materials using a coextrusion method.

14. The backlight module of claim 12, wherein at least one layer forming the base includes organic beads such as polycarbonate, polymethylmethacrylate, MS resin and polystyrene or inorganic beads such as silica and silicon dioxide.

* * * * *